US006975779B1

(12) United States Patent
Brett et al.

(10) Patent No.: US 6,975,779 B1
(45) Date of Patent: Dec. 13, 2005

(54) METHOD FOR MODIFYING THE IMAGE SIZE OF VIDEO IMAGES

(75) Inventors: Maik Brett, Hofheim (DE); Xiaoning Nie, Munich (DE); Dirk Wendel, Unterhaching (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/806,071

(22) PCT Filed: Sep. 21, 1999

(86) PCT No.: PCT/DE99/03010

§ 371 (c)(1),
(2), (4) Date: Jun. 1, 2001

(87) PCT Pub. No.: WO00/19715

PCT Pub. Date: Apr. 6, 2000

(30) Foreign Application Priority Data

Sep. 28, 1998 (DE) ................................ 198 44 404

(51) Int. Cl.[7] .............................................. G06K 9/32
(52) U.S. Cl. ..................... 382/298; 382/256; 382/299; 348/580; 348/747
(58) Field of Search ............................... 382/293, 295, 382/298, 299; 358/451, 452, 537; 348/580, 348/581, 575

(56) References Cited

U.S. PATENT DOCUMENTS

| 4,656,515 | A | | 4/1987 | Christopher |
| 4,908,874 | A | | 3/1990 | Gabriel |
| 4,991,010 | A | * | 2/1991 | Hailey et al. ............... 348/443 |
| 5,140,416 | A | * | 8/1992 | Tinkler ........................ 348/33 |
| 5,231,487 | A | * | 7/1993 | Hurley et al. .......... 375/240.01 |
| 5,384,869 | A | * | 1/1995 | Wilkinson et al. .......... 382/240 |
| 5,574,572 | A | * | 11/1996 | Malinowski et al. ....... 358/451 |
| 6,122,016 | A | * | 9/2000 | De Haan et al. ............ 348/620 |
| 6,285,711 | B1 | * | 9/2001 | Ratakonda et al. .... 375/240.16 |

FOREIGN PATENT DOCUMENTS

| DE | 196 00 963 C1 | 4/1997 |
| EP | 0 601 819 A1 | 6/1994 |

* cited by examiner

Primary Examiner—Sanjiv Shah
Assistant Examiner—Yosef Kassa
(74) Attorney, Agent, or Firm—Peter F. Corless; Steven M. Jensen; Edwards & Angell, LLP

(57) ABSTRACT

The invention relates to a method for changing the image size of video images, in which a decimation of video image signals (V) by an integral decimation factor (MHD, MVD) is carried out, and the decimated video image signals are subsequently read into an image memory for buffering.

In order to achieve better possibilities of adjusting the image reduction with a relatively low outlay and high image quality, a fine decimation of the video image signals (V) is additionally carried out before buffering by a fine decimation factor (SHS, SVS) which can be adjusted to non-integral values, and a total decimation factor (MH, MV) relevant to the decimation of the video image signals (V) is formed from the integral decimation factor (MHD, MVD) and the fine decimation factor (SHS, SVS).

18 Claims, 2 Drawing Sheets

METHOD FOR MODIFYING THE IMAGE SIZE OF VIDEO IMAGES

BACKGROUND OF THE INVENTION

Such changes in image size are required, in particular, for picture-in-picture (PiP) insertions, in the case of which a small image is faded into a main image. The image size of the small image is reduced for this purpose in proportion to the main image. For a known image reduction, reduction in a horizontal direction and in a vertical direction correspond to one another in this case, resulting in total reduction factors which correspond to reciprocal squares such as $\frac{1}{4}$, $\frac{1}{9}$, $\frac{1}{16}$, $\frac{1}{36}$. The image signals thus reduced are read into an image memory together with the image signals of the main image for the purpose of synchronization, in which the pixels and lines occurring over the duration of a small image line or of the entire small image are stored, in order to achieve the change in image size.

A finer change in the horizontal reduction factor is possible, for example, by changing the read-out frequency of the image memory. A corresponding change in the vertical reduction factor is, however, not possible since the vertical frequency is fixed by the TV standard.

BRIEF SUMMARY OF THE INVENTION

The invention is based on the object of achieving better possibilities for adjusting the image reduction in conjunction with a relatively low outlay and high image quality.

This object is achieved by means of a method according to claim 1. The subclaims describe preferred developments of the method according to the invention.

A large range of decimation factors can therefore be achieved by combining the integral decimation with a fine decimation, with the aid of which non-integral values can be registered, before the buffering in the image memory. A total decimation can be achieved as a product of two individual decimations, since the latter are carried out consecutively.

In particular, a continuous or quasi-continuous numerical range such as, for example, from 1 to 1.5 can be adopted for the fine decimation. It can be bounded in a sensible way by combination with the integral decimation, since a larger range of non-integral values can be covered by multiplying non-integral values with integral values. For this purpose, a range for the total decimation factor which comprises several integral values can be covered, in particular, by appropriately tuning this adjustable integral decimation factors and fine decimation factors to one another without this range having gaps of values which cannot be adjusted.

An appropriate decimation filter is generally used in the decimation of several image signals to form an image signal for which the single value is formed from several values. It is possible to make use for this purposes in particular of a decimation filter with a low-pass effect which therefore has an integrating effect and suppresses noise. This low-pass effect can advantageously be used for noise suppression of the output signals of the fine decimation by following the fine decimation with the integral decimation. Furthermore, an additional low-pass filtering can also be carried out before the two decimations; the flattening of the signals effected by the low-pass filter or low-pass filters can be compensated by subsequent frequency response crispening.

The fine decimation by non-integral values can advantageously be achieved in this case by linear interpolation of video image signals.

The decimation according to the invention can be use in this case both for the horizontal and for the vertical decimation of the video image signals. In particular, it is possible thereby to create a method for fine-step or stepless changing of image size, in the case of which the variations in the horizontal and vertical directions can be undertaken independently of one another in fine steps.

BRIEF DESCRIPTION OF THE DRAWING

The invention is explained in more detail below with the aid of the attached drawings and with reference to a few embodiments. In the drawing.

The method according to the invention can be used in principle for changing image size in the vertical and/or horizontal directions.

Figure 1:
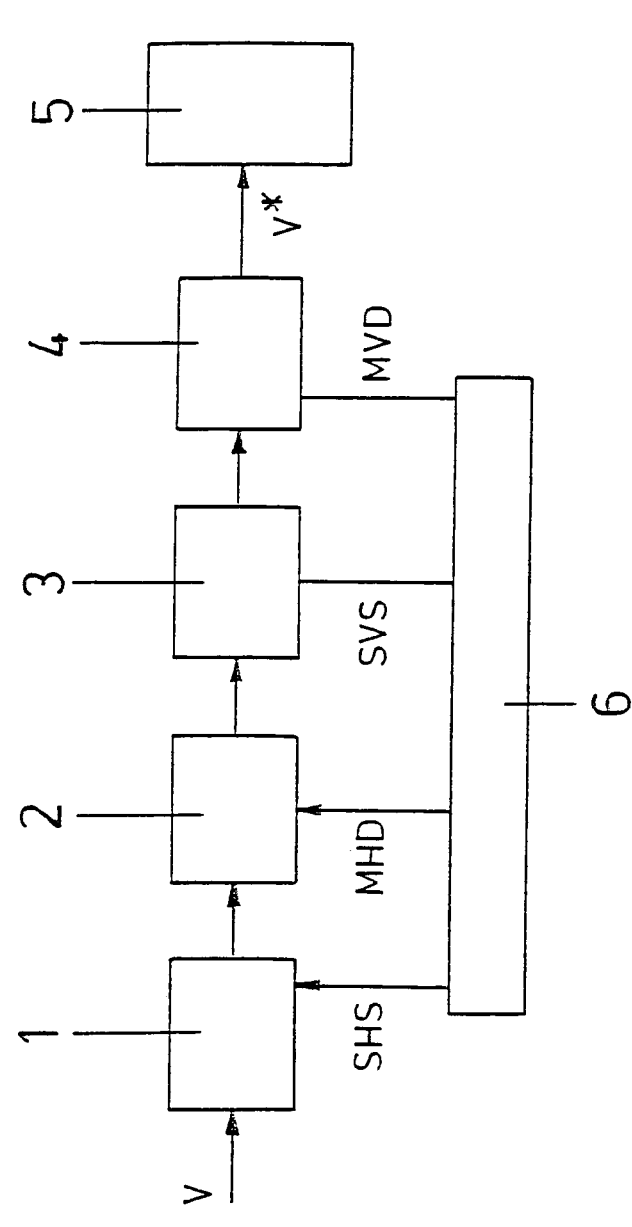
FIG. 1 shows a block diagram of a method according to the invention for horizontal and vertical changing of image size.

In the case of a method for stepless or fine-step changing of image size in both directions in accordance with FIG. 1, a video signal V of a small image to be reduced is subjected consecutively to horizontal and vertical decimation and subsequently read into an image memory 5 as a horizontally and vertically decimated video image signal V*, in which memory it is stored together with a main image such that the superimposed video image can subsequently be read out of the image memory 5.

The video signal V passes for this purpose consecutively into a horizontal scaler 1 for horizontal fine decimation, a horizontal decimation filter 2 for integral horizontal decimation and low-pass filtering, a vertical scaler 3 for vertical fine decimation, and a vertical decimation filter 4 for integral vertical decimation and low-pass filtering. Control signals SHS, MHD, SVS, MVD are input by a control device 6 into the respective scalers 1, 3 and in decimation filters 2, 4.

The horizontal decimation is performed in this case before the vertical decimation, since this reduces the outlay on storage for the line delays required in the vertical decimation by the amount of the horizontal reduction.

The horizontal decimation filter 2 effects sub-sampling by an integral decimation factor MHD. For this purpose, it is possible in principle to use a known decimation filter, such as, for example, a decimation filter with a low-pass effect. It is possible with such decimation filters also to make use, in particular, of the noise-suppressing and integrating effect of the low-pass filters. It is possible, however, to use an MTA core filter which permits a filter characteristic to be adapted to various decimation factors.

The horizontal scaler 1 permits fine-step or stepless decimation of the incoming video signal V of the small image by the fine decimation factor SHS. This fine-scaling therefore also requires, if appropriate, decimation by non-integral fine decimation factors SHS. For this purpose, the horizontal scaler 1 has an interpolation filter which operates in a time-variable fashion and calculates the samples required for fine-scaling. The scaler carries out the conversion necessary for converting the sampling rate from an initial sampling rate LHS to a sampling rate MHS, for example as oversampling by the factor LHS, filtering and sub-sampling by the factor MHS. For the case in which LHS<MHS, the desired reduction in the number of pixels is undertaken by reducing the sampling rate. The number of pixels and the sampling rate are increased for LHS>MHS. It is possible to keep LHS fixed in this case, since adjusting the decimation factor suffices for adjusting the reduction factor. The factor SHS can therefore be formed in accordance with the equation MHS=LHS+SHS. A reduction in the number of pixels therefore results in each case.

Figure 3:
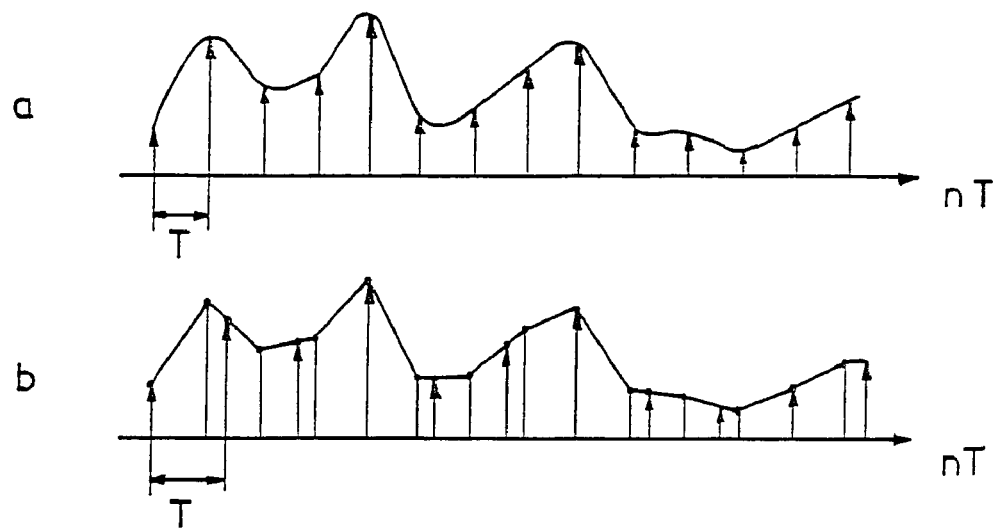
FIGS. 3a, b show timing diagrams of video image signals for the purpose of explaining the fine decimation of image signals according to the invention.

An upper bound is selected for the reduction factor, which can be 1.5 or 2, in order to avoid interfering effects in the filtering. In this case, the scaler also permits a delay of less than one sampling period, that is to say MHS/LHS<1, which can advantageously be used to compensate the raster error in the case of asynchronous sampling rasters. The time diagrams of FIG. 3 show the known mode of operation of the scaler 1 used for fine decimation. In accordance with FIG. 3a, a signal is sampled with the time period T. Phase-shifted values can be determined from these values by linear interpolation in accordance with FIG. 3b, as is shown here by a period T*. Starting from a sample and the sample delayed by one period, the interpolator calculates a new sample on the basis of the phase newly calculated for each period. If the phase values exceeds the range of one sampling period, the sample actually to be calculated is firstly omitted, thus achieving fractional rational decimation. Not until the following cycle is a new sample calculated, the phase value being corrected by a simple overflow arithmetic. Such an interpolation is required in this case in the determination of non-integral decimations; if an integral total decimal is selected, this can possibly be achieved directly by MHD by setting the fine decimation factor MHS/LHS=1. In principle, it is also possible to make use instead of a linear interpolator of any other interpolator of the n-th order for the scaler 1.

Figure 2:
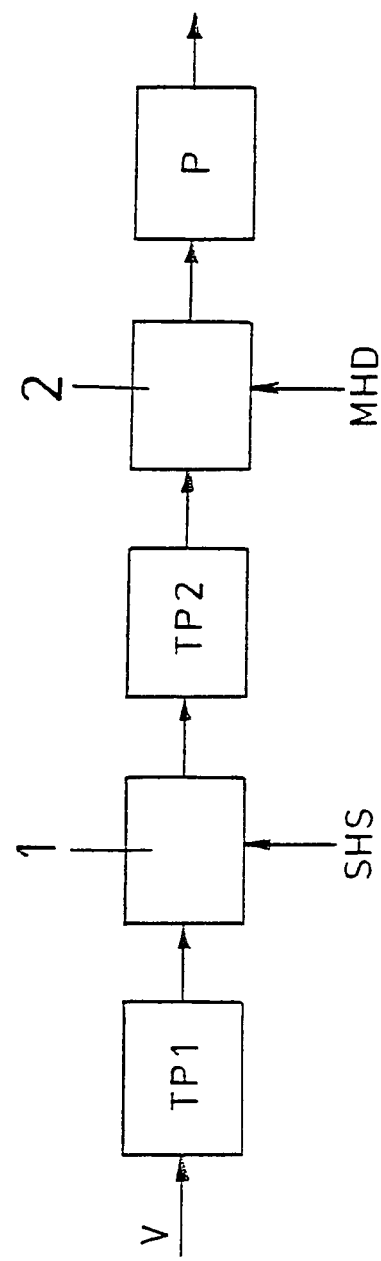
FIG. 2 shows a block diagram of a method according to the invention for horizontal changing of image size.

Since the decimation filter 2 with integral decimated is connected downstream of the scaler, its low-pass effect can reduce a possibly interfering signal spectrum following a non-ideally interpolating scaler. Furthermore, in accordance with FIG. 2 a low-pass filter TP1 is arranged upstream of the scaler 1, in order as the low-pass pre-filter to increase this stop-band attenuation. Steeper signals can be achieved, in turn, by a peaking P, downstream of the decimation filter 2, for the purpose of frequency response crispening. The peaking can be kept adjustable in this case in order to permit optimum adaptation to subjective picture impressions.

By combining the horizontal scaler 1, which can be adjusted in fine steps or steplessly by the fine decimation factor MHS/LHS, and the decimation filter 2, which can be adjusted by an integral decimation factor MHD, it follows that a total decimation factor MH is given by MH=MHD ( MHS/LHS=MD * (1+(SHS/LHS), MHD and SHS being adjustable. The number of pixels PD after the decimation is then yielded from the sample pixels PB to PD=PS/MH. A large range of decimation factors can be adjusted by suitable combination of the factors for the two decimations. Thus, a gapless range of the total decimation factor from 2 to 12 can be adjusted by selecting 2, 3, 4, 6, and 8 as possible values for MHD and a fine decimation factor in the range of 1 to 1.5.

The use of multistep decimation filters which operate with several reduction factors is recommended for very large adjustable reduction factors. For the frequency response to the decimation filter set up for optimum image quality, the scaling means a change in the frequency axis, the form of the frequency response of the decimation filter being virtually retained, but the band limit moving ever further in the direction of the frequency 0. The targeted change in image size is thereby achieved virtually without loss of image quality.

Figure 4:
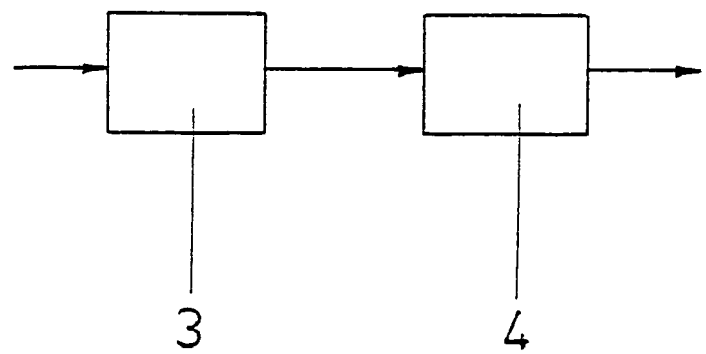
FIG. 4 shows a block diagram of a method according to the invention for vertical changing of image size.

In accordance with FIG. 4, in principle the vertical decimation stage can be constructed in a way corresponding to the horizontal decimation stage. Differences can arise from the mode of action of vertical filters, which required delays by a scanning line instead of delays by sampling periods.

In the case of line delay in the line delay device Z1, the pixels of a scanning line are stored and made available sequentially at the start of the next scanning line. The vertical scaler 3 calculates a new scanning line from the current and at least one delayed scanning line. The phase value is recalculated exactly once per line at the beginning. When it follows from the calculated phase value that the delayed line is not contributing to the new line, the output of this line is suppressed. Fractional rational decimation in the vertical direction is achieved in this way.

The quality of the vertical decimation filter 4 is chiefly limited by the number of available line delays in the line delay device Z2. Usually, sequential lines are simply accumulated in the case of only one time delay present. The vertical decimation stage can also undertake several line delays. In accordance with FIG. 4, the vertical decimation filter 4 also has a low-pass effect. The vertical total decimation factor is yielded as MV=MVD * MVS/LVS=MVD * (1+(SVS/LVS)), MVD and SVS being adjustable. The number of lines LD after decimation is then yielded from the sampled pixels LS as LD=LW/MV.

It is thereby possible to implement independent control of the vertical and horizontal decimation in a simple way and with a low outlay on hardware. Both the horizontal and the vertical decimation can be performed with non-integral values in a stepless or fine-step fashion. The fine-stepping of the scaling is possibly limited only by the resolution into whole pixels and lines. Optimum filtering, and thus a high image quality can be achieved with the aid of the low-pass filters and, if appropriate, peaking. The solution according to the invention can also be implemented in the case of existing decimation filters by adding the scaler or scalers, or connecting them upstream.

What is claimed is:

1. A method for changing the images size of video images, decimation of video image signals being carried out by an integral decimation factor and a fine decimation of the video image signals additionally being carried out by a fine decimation factor which can be adjusted to non-integral values, and a total decimation factor relevant to the decimation of the video signals being formed from the integral decimation factor and the fine decimation factor, characterized in that firstly the fine decimation of the video image signals by the non-integral fine decimation factor, and subsequently the decimation by the integral decimation factor are carried out.

2. The method of claim 1 wherein an integral decimation factor and a fine decimation factor whose product yields the total decimation factor are determined for a prescribed total decimation factor.

3. The method of claim 2 wherein the integral decimation factor and the fine decimation factor can be adjusted in such a way that a range of total decimation factors comprising several integral values can be set.

4. The method of claim 3 wherein the values 2, 3, 4, 6, 8 can be adjusted for the integral decimation factor.

5. The method of claim 3 wherein values in a range of 1 to 1.5 or 1 to 2 can be adjusted for the fine decimation factor.

6. The method of claim 1 wherein low-pass filtering is undertaken during the integral decimation.

7. The method of claim 6 wherein additional low-pass filtering is undertaken before the integral decimation.

8. The method of claim 1 wherein low-pass filtering is undertaken before the integral decimation.

9. The method of claim 1 wherein the fine decimation comprises a linear interpolation of video image signals.

10. The method of claim 1 wherein low-pass filtering is carried out before the fine decimation.

11. The method of claim 1 wherein frequency response crispening is carried out after the integral decimation.

12. The method of claim 1 wherein horizontal decimation of the video image signals is carried out.

13. The method of claim 1 wherein vertical decimation of the video image signals is carried out.

14. The method of claim 12 wherein firstly horizontal, and subsequently vertical decimation are carried out.

15. The method of claim 13 wherein firstly horizontal, and subsequently vertical decimation are carried out.

16. A device for changing the image size of video images, having a decimation filter (2; 4) for carrying out decimation of video image signals by an integral decimation factor, and having a scaler for additionally carrying out fine decimation of the video image signals by a fine decimation factor which can be adjusted to non-integral values, such that a total decimation factor relevant to the decimation of the video image signals is formed from the integral decimation factor, and the fine decimation factor, characterized in that the decimation filter for decimation by the integral decimation factor is connected downstream of the scaler for fine decimation by the non-integral fine decimation factor.

17. The device of claim 16 further including a control device for outputting the integral decimation factor and the non-integral fine decimation factor.

18. A method for changing the image size of video images, decimation of video image signals being carried out by an integral decimation factor, and a fine decimation of the video image signals additionally being carried out by a fine decimation factor which can be adjusted to non-integral values, and a total decimation factor relevant to the decimation of the video signals being formed from the integral decimation factor and the fine decimation factor, characterized in that firstly the fine decimation of the video image signals by the non-integral fine decimation factor, and subsequently the decimation by the integral decimation factor are carried out, wherein an integral decimation factor and a fine decimation factor whose product yields the total decimation factor are determined for a prescribed total decimation factor.

* * * * *